(No Model.) 2 Sheets—Sheet 2.
R. BAUER.
SAW SETTING MACHINE.
No. 534,598. Patented Feb. 19, 1895.
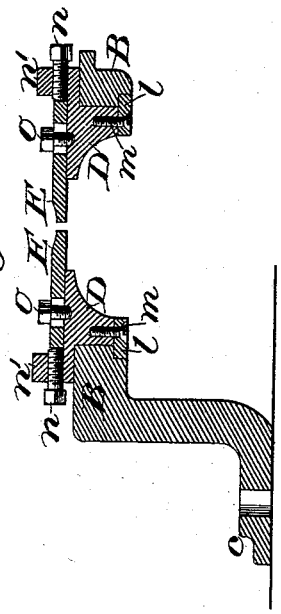
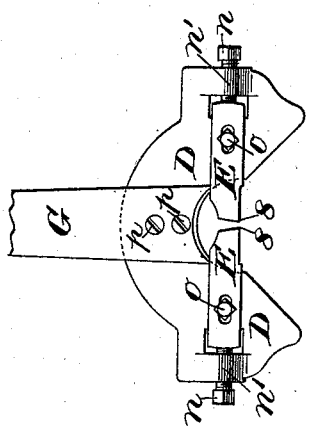
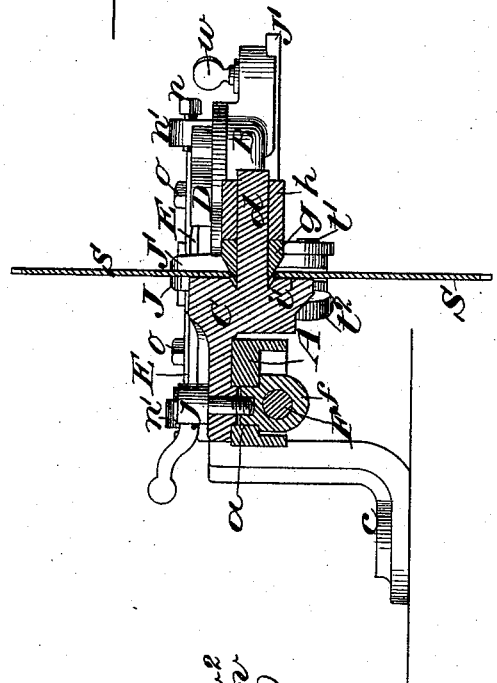
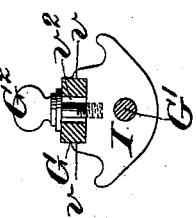
Witnesses:
George Barry.
C. F. Sundgren
Inventor:
Richard Bauer
by attorney
Brown & Seward

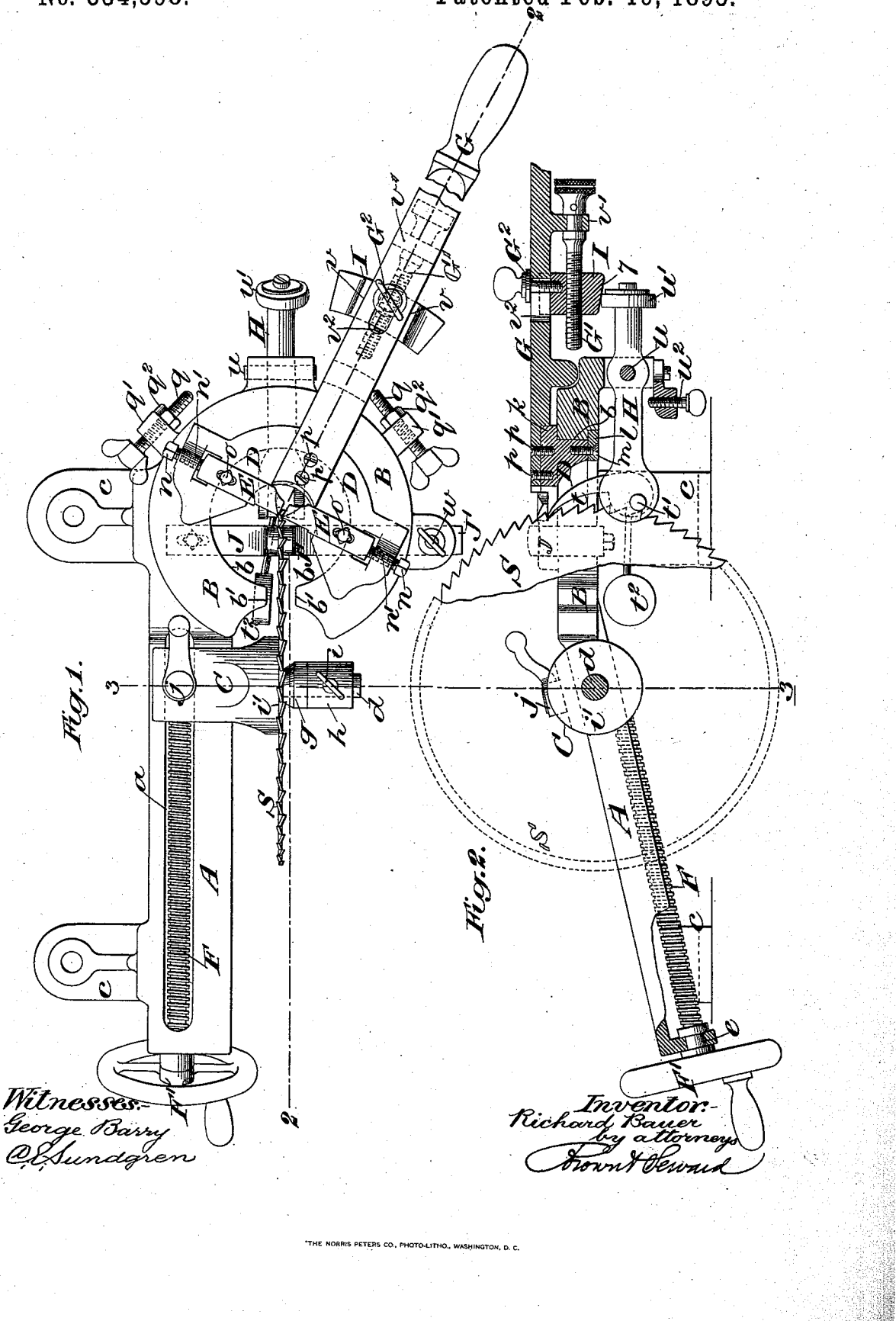

UNITED STATES PATENT OFFICE.

RICHARD BAUER, OF NEW YORK, N. Y., ASSIGNOR TO PAUL PRYIBIL, OF SAME PLACE.

SAW-SETTING MACHINE.

SPECIFICATION forming part of Letters Patent No. 534,598, dated February 19, 1895.

Application filed July 11, 1894. Serial No. 517,178. (No model.)

*To all whom it may concern:*

Be it known that I, RICHARD BAUER, of the city and county of New York, in the State of New York, have invented a new and useful Improvement in Saw-Setting Machines, of which the following is a specification.

I will first describe with reference to the accompanying drawings a circular saw setting machine embodying my invention and afterward point out its novelty in claims.

Figure 1 represents a plan view of the machine; Fig. 2, a vertical section taken substantially in the line 2, 2 of Fig. 1, a part of the saw being removed to show parts of the machine behind it. Fig. 3 is a vertical section taken in the plane indicated by the line 3, 3, of Figs. 1 and 2; Fig. 4, a transverse vertical section taken through the setting die-stock and the seat or bearing by which it is capable of a partial rotation. Fig. 5 is a plan view of the die-stock and setting dies. Fig. 6 is a detail view to be hereinafter explained.

A B designate the base of the machine consisting of a straight bed A in which is a slideway $a$ for the saw carriage C and a circular portion B containing a circular seat $b$ constituting a bearing in which is capable of turning the die-stock D which contains the setting dies E E, the said die-stock being centered in said seat and supported therein on the opposite sides of its own center on which the dies are situated. The said base is furnished with feet $c\ c$ through which it is bolted to a bench or any suitable foundation on which the circular portion B occupies a horizontal position and the straight portion or carriage bed A an inclined position as shown in Fig. 2, the said straight portion or bed being, as shown in Fig. 1, offset to one side of the said circular portion.

The saw carriage C is represented as consisting of a puppet head fitted to move in the slideway $a$ in which it is adjustable toward and from the setting dies by means of a screw F operated by a hand-wheel F′, the said screw being fitted to a nut $f$ (see Fig. 3) attached to the bottom of the carriage and also being so fitted to a bearing $e$ in the base as to be capable of turning freely but to be confined longitudinally therein. The said carriage is also represented as provided with a short horizontal spindle $d$ over which the circular saws S to be set are placed. This spindle has fitted to it a loose cone $g$ which enters the eye of the saw and centers it. The said spindle is also fitted outside of the said cone with a clamping collar $h$ in which is a set screw $i$ by which the said collar is held against the cone in such manner that the latter holds the saw against the flat vertical portion or face $i$ of the carriage which surrounds the said spindle. This face $i$ is so situated that the plane of the saw S held against it as above described, coincides with the vertical axis of the setting die stock D and its seat $b$ as may be understood by reference to Fig. 1.

The adjustment of the saw carriage C above described is for the purpose of adapting the machine to the setting of saws of different sizes so that the teeth of the saw whatever its size, may be brought to the center of the setting die stock. The nut $f$ in which the adjusting screw F works is attached to the carriage C by means of a screw $j$ which passes through the portion of the carriage over the slideway and screws into the nut in such manner that after the adjustment has been made by the screw F, the carriage may be clamped to the slideway by screwing up the screw $j$ and may thereby be made to hold the saw in proper relation to the setting die. By slightly slackening the screw $j$ the carriage is left free to be moved by the screw F. The same adjustment by means of the screw F also provides for the adjustment of the saw that it may enter more or less between the setting dies as may be required according to the depth of the teeth of the saw.

The circular seat $b$ provided in the base for the die stock D has an opening at $b'$ for the entrance of the saw. The die-stock D is in the form of a sector of a circle sufficiently greater than a semicircle to permit it to be retained in the seat or bearing $b$ and to enable it to contain the setting dies E E which are arranged in approximately radial positions in the said die on opposite sides of the center thereof. The said stock is made with a flange $k$ which is supported on the base around the seat $b$ and it is held down in the seat by a flange plate $l$ secured to it below the said seat by screws $m$ as shown in Figs. 2 and 4. The upper face of the said stock is grooved for the reception of the setting dies E E the inner or operating ends of which are directed toward the center of the stock and terminate on opposite sides of a line passing through the center of the stock with a space between them just sufficient for the passage of the saw between them the points or angles 8 formed between the said ends of the dies and those sides thereof which are toward the saw carriage being, as may be understood by reference to Figs. 1 and 5, as near the exact center of the stock as is possible allowing for the space between the said ends for the passage of the saw. The adjustment of these dies according to the thickness of the saw so that the saw may just pass between them is effected by means of set screws $n$ screwing through lugs $n'$ on the stock and bearing against the outer ends of the dies. This adjustment is secured by binding screws $o$ passing through slots in the dies and screwing into the stock.

By the turning or partial rotation of the die-stock in the seat $b$ the setting of the teeth of the saw is produced. For the purpose of producing this partial rotation the die stock is represented as furnished with a hand-lever G which is secured to it by screws $p$ $p$. The amount of movement permitted to this lever and consequently to the die-stock according to the degree of set required to be given to the teeth is regulated by two adjustable stop screws $q$ which are screwed into lugs $q'$ on the portion B of the base, this adjustment being secured by jam nuts $q^2$ on the screws $q$.

H is a pawl carrier carrying the pawl $t$ which acts upon the teeth of the saw to move it tooth by tooth for the purpose of advancing the teeth successively to the necessary position between the setting dies previous to each operation of the setting dies. This pawl carrier H consists of a lever working on a fixed fulcrum $u$ under the portion B of the base, one end of the said lever having the pawl pivoted to it by a pivot $t'$ and the other end being furnished with an antifriction roller $u'$ which is situated under a cam I which is secured to the setting die by being attached to its lever G. This cam I is shown in Figs. 1 and 2 but its form is better illustrated in Fig. 6 which represents a transverse section of the lever and a profile view of the cam. Every time the lever G is moved in one direction or the other from one to the other of the stop screws $q$ to operate the setting dies, the said cam depresses the outer end of the pawl carrier and so produces the action of the pawl upon the saw. The pawl $t$ is represented as having attached to it a weight $t^2$ which serves the double purpose of holding the pawl to the teeth and of producing the return movement of the pawl carrier and pawl after the cam I passes the antifriction roller $u'$. This return movement which must be greater or less according to the spacing of the saw teeth is regulated by an adjustable stop screw $u^2$ under the lever H. To provide for the proper upward movement of the pawl $t$ so that whatever may be the spacing of the teeth of the saw, the faces of the teeth shall always be brought up to a position approximately on a level with the lower edges of the setting dies. The cam I has its operating face inclined downward and outward as shown at 7, in Fig 2, and the said cam is made adjustable toward and from the center of the setting die. This adjustment is provided for by fitting the cam to the sides of the lever as shown at $v$ in Figs. 1 and 6, so that it may slide thereon and by providing it with an adjustable screw $G'$ and a binding screw $G^2$, said adjusting screw being fitted to turn without moving longitudinally in the lugs $v'$ on the lever and screwing through the said cam and a set screw $G^2$ being inserted through a horizontal slot $v^2$ in the lever and screwing into the back of the cam. By adjusting the said cam to bring a more prominent portion of its inclined face to operate upon the pawl carrier, the pawl is made to terminate its upward movement in a higher position or by adjusting it in the opposite position the pawl is made to terminate its upward movement in a lower position.

To provide for steadying the saw during the setting operation, there are arranged between the setting dies and the saw carriage two adjustable guides J J' consisting of bars fitted to grooves in the bottom of the portion B of the base and having their inner ends turned upward to face each other. These guides are so set that there is just room for the saw to pass freely between them. In order to accommodate them to saws of different thicknesses one or both should be adjustable. Only one of them, viz., J', is represented as adjustable inward and outward, its adjustment being secured by a set screw $w$. (See Figs. 1 and 3.) By slackening this screw the movement of the guides J' inward or outward is permitted.

The operation of the machine is as follows: The saw having been secured in the carriage, the saw carriage having been properly adjusted toward the die-stock and dies according to the size of the saw and the depth of its teeth, the setting dies E having been adjusted in the stock according to the thickness of the saw, the stop screws $q$ having been adjusted according to the amount of set desired to be given to the teeth and the cam D having been adjusted to regulate the upward movement of the pawl carrier and the pawl, all that is necessary for the operation of the machine is to move the hand-lever back and forth between the stop screws $q$. Every time the lever is moved in either direction the cam I passing over the antifriction roller $u'$ turns the saw to the extent of one tooth thereby presenting between the setting dies a new tooth which is set by the setting dies by the continuation of the same movement of the lever. The movement of the pawl carrier and of the saw takes place during so short a portion of the movement of the lever and the setting dies and before the latter arrive at their central position, that the setting operation does not interfere with and is not interfered with by the setting of the saw, the latter operation not commencing until after the lever has passed its central position.

In order to prevent the setting dies during the first half of their movement in either direction which takes place prior to and during the movement of the saw, from having any action on the previously set saw tooth remaining between them, the operative inner ends of the dies are so slanted in a backward direction from the center of the die-stock, as shown in Fig. 1 and more clearly in Fig. 5, that the space between them is widened from the points or angles 8.

What I claim as my invention is—

1. In a saw-setting machine, the combination with a die-stock and setting-dies on opposite sides of the center thereof, of a circular seat in which the said stock is centered and within which it is supported at the opposite sides of the center on which the dies are situated, substantially as herein set forth.

2. The combination with the circular die-stock D and the circular seat *b* for said stock having an opening *b'* for a saw, of the guides J J' fitted to said seat at opposite sides of said opening, one of the said guides being adjustable inward and outward, substantially as herein described.

3. The combination of a holding device for a saw, a die stock containing setting dies, a bearing or seat in which said stock is capable of a partial rotation transversely to a saw in said holding device, a pawl carrier and pawl for advancing the saw tooth by tooth, a cam having an inclined face attached to and moving with said die stock for actuating said pawl carrier, and means of adjusting said cam toward and from the center of the said stock, substantially as herein set forth.

4. In a saw-setting machine, the combination of a stationary bed containing a horizontal circular seat and straight ways, a circular setting die-stock fitted to and capable of a partial rotation in said seat, setting dies in said die-stock, a carriage fitted to run within said ways toward and from said dies and comprising a pivot for a circular saw, a pawl carrier and pawl for turning the saw on said pivot, and a cam attached to said die-stock for actuating said pawl carrier and pawl, substantially as herein set forth.

In testimony whereof I have hereunto signed my name, this 18th day of June, 1894, in the presence of two subscribing witnesses.

RICHARD BAUER.

Witnesses:
 FREDK. HAYNES,
 L. M. EGBERT.